United States Patent Office 3,669,680
Patented June 13, 1972

3,669,680
PEROXIDE EXTRACTION OF TEA LEAF
Martin Gurkin, Bardonia, N.Y., and Gary Warner Sanderson and Victor Vernon Studer, Englewood, N.J., assignors to Thomas J. Lipton, Inc., Englewood Cliffs, N.J.
No Drawing. Filed Nov. 12, 1969, Ser. No. 876,044
Int. Cl. A23f 3/00
U.S. Cl. 99—77    11 Claims

ABSTRACT OF THE DISCLOSURE

A process for extracting whole and spent tea leaf using peroxide solutions, including the steps of bringing peroxide into contact with tea leaves in the presence of moisture to extract tea solids removing the leaf residue from the extract and drying the filtrate if desired, to recover the dried tea solids.

---

This invention relates to a process for extracting whole and spent tea leaf, and more particularly to a process for increasing the yield of soluble tea solids from tea leaves.

It is a continuing goal of the instant tea industry to find new methods for increasing the yield of tea solids obtainable from tea leaves. Although the present extraction methods employing countercurrent hot water extraction techniques, such as described in U.S. Pat. No. 2,902,368 to Seltzer et al., have been successful in removing a considerable portion of the tea solids from the leaves, it is recognized that appreciable amounts of tea solids remain in the tea leaves following hot water extraction and thereby constitute a potential source of additional material for increasing the yield of instant tea powders. At the present time spent tea leaves, i.e., tea leaves which have been extracted with hot water, are discarded since no economical method is known to extract significant amounts of tea solids from the spent tea leaves.

It is therefore an object of this invention to provide a process for extracting increased amounts of tea solids from whole and from spent tea leaves. It is also an object of this invention to provide a process for extracting tea leaves using peroxide solutions.

According to the process of this invention, leaves are extracted with solutions of peroxide to yield increased amounts of tea solids suitable for inclusion in instant tea powders. The extracted tea solids are soluble in cold hard water without further processing, and are characterized by having a light color and a bland taste. In practicing this process with whole tea leaf, amounts of soluble tea solids up to 34% of the dry weight of original tea leaf have been obtained. When spent tea leaf was extracted according to the invention, amounts of soluble tea solids up to 12% of the dry weight of original unextracted tea leaf have been obtained. This represents an increase of approximately 40% over the amount of tea solids extracted from original leaf with current hot water techniques.

In practicing the process with spent tea leaves (previously extracted with hot water), peroxide is brought into contact with the tea leaves in the presence of moisture, preferably in an aqueous suspension of the leaves. The peroxide is allowed to act upon the spent tea leaf, thereby extracting tea solids which were not extracted in the initial hot water extraction process. The extracted spent leaves are removed from the filtrate which contains the dissolved tea solids, and the filtrate may be evaporated if desired to recover the tea solids.

To practice the process with unextracted tea leaf, peroxide is brought into contact with the tea leaves in the presence of moisture to extract the soluble tea solids. Following the extraction, the leaf residue may be removed and the filtrate polished. The resulting tea solids possess good solubility and clarity when reconstituted with water.

In practicing the invention it has been found that a satisfactory range of peroxide concentration in the tea leaf suspension is approximately 3% to 10% peroxide based upon the dry weight of tea leaves contained in the suspension. The term peroxide as used according to this invention includes hydrogen peroxide and alkali peroxides that form hydrogen peroxide in aqueous solution.

During the extraction it was found advantageous to boil the suspension at approximately 100° C. Under boiling conditions the extraction period ranged from approximately 5 minutes to 2 hours depending upon the concentration of peroxide in the suspension, and shorter extraction times are preferred as being less deleterious to flavor and more economical.

Following extraction of the suspension, it is necessary to remove the leaf residue which may be in a rather finely divided form. Filtering through cheese cloth was found adequate to remove the leaf particles, although other means of removal could be used.

It is preferred to adjust the pH of the filtrate to approximately pH 4.9 to 5.0, the pH of a neutral tea extract. The presence of hydrogen peroxide lowers the pH of the suspension to approximately 4.2, and the pH may be adjusted by the addition of base such as potassium hydroxide. The filtrate may also be decreamed and dehazed according to standard procedures, if desired.

The filtrate containing the dissolved soluble tea solids derived from spent tea leaves may be employed without further processing as an addback to a hot water extract of original tea leaf. The combined extracts may then be processed to dryness according to procedures known in the arc for preparing instant tea powders, thereby increasing the yield of instant tea powder.

If it is desired to recover the dissolved tea solids in dried form, the filtrate may be dried by known means, such as spray drying or freeze-drying, to recover the tea solids. The dried tea solids may also be added back to the hot water tea extract or powder to increase the yield of instant tea powder.

In the embodiment for treating unextracted tea leaf, the resulting spent leaf residue may be reextracted by adding the residue to a hot (100° C.) water wash at pH 5, which results in extracting additional tea solids (approximately 9%). Combining and polishing the extracts produces tea solids constituting approximately 42% of the whole black tea. This is substantially more extract solids than can be extracted with hot water alone under these conditions. The final reconstituted tea beverage possesses good color and is soluble in hot water.

The tea solids obtainable through the use of this process may be employed in a variety of ways in processing instant tea powders. As shown above the addition of the soluble tea solids obtained by this process to the tea solids obtained from the initial hot water extraction increases considerably the yield of processed instant tea powder. The combined extracts may be processed to decream and dehaze using techniques known to those skilled in the art. Similarly, the tea solids removed by decreaming the combined extracts may be solubilized and returned to the product. The tea solids may also be used as fixatives for the constituents of tea aroma to be added back to the instant tea solids.

It is believed that the tea solids obtained according to the process contain materials which otherwise cannot be extracted using standard hot water extraction techniques. It is of considerable importance that substantially all of the tea solids which are extracted according to this process are soluble in cold hard water without further processing.

The following examples are intended to illustrate the invention and should not be construed as limiting in any way the scope of the invention.

EXAMPLE 1

Fresh black fired tea leaf was extracted using standard hot water countercurrent extraction techniques. Portions of the wet spent tea leaf weighing 264 grams net weight and containing approximately 70% moisture were combined with 800 ml. portions of distilled water containing the percentages of hydrogen peroxide shown in Table 1 below. The suspensions were boiled gently at approximately 100° C. for 45 minutes to extract the spent tea leaf. The suspensions were then filtered through cheesecloth and the filtrates were adjusted to pH 5.0 with 5 N KOH. The filtrates were freeze-dried to recover the soluble tea solids. The results of the extractions are shown in Table 1 below.

TABLE 1.—EFFECT OF HYDROGEN PEROXIDE ON THE EXTRACTION OF SPENT TEA LEAF

| | Percent $H_2O_2$ in the extraction medium (based on dry weight of spent tea leaf) | | |
|---|---|---|---|
| | 3.5 | 7.0 | 10.0 |
| Weight of extract, g | 784 | 816 | 776 |
| Concentration of extract, percent solids | 1.17 | 1.51 | 1.72 |
| Yield, percent of spent leaf | 11.5 | 15.5 | 16.9 |
| Yield, percent of original leaf | 8.0 | 10.9 | 11.8 |
| pH of Extract* | 4.4 | 4.2 | 4.0 |

*Adjusted to pH 5.0 with 5 N KOH.

EXAMPLE 2

A portion of wet spent tea leaf weighing 130 pounds was concerned with 400 pounds or distilled water. A 35% solution of hydrogen peroxide weighing 4 pounds was combined with the tea leaf suspension. The suspension was boiled for 30 minutes and filtered through cheese cloth. The pH of the filtrate was adjusted from 4.2 to 5.0 with potassium hydroxide and dried by freeze-drying. The yield of soluble tea solids constituted 11.13% of the dry spent tea leaf.

EXAMPLE 3

A portion of black tea leaf weighing 50 pounds was extracted with hot water using counter-current extraction techniques. The hot water extract was decreamed and dehazed using standard procedures. The wet spent leaf (weighing about 35 pounds dry weight) was combined with 350 pounds of distilled water to form an aqueous spent leaf suspension. A 35% solution of $H_2O_2$ weighing 3.5 pounds (3.5% $H_2O_2$ on a dry spent tea leaf basis) was added to the tea leaf suspension. The suspension was brought to a boil and simmered for 30 minutes, then filtered. The pH of the extract was adjusted to pH 5.0 with potassium hydroxide. A yield of about 8% soluble solids based upon the weight of the original black tea was obtained. The original hot water extract and the peroxide extract were combined, polished by centrifugation, concentrated, and spray-dried. The overall yield of the tea solids constituted approximately 38% of the original black tea.

EXAMPLE 4

50 grams of whole black tea leaf was combined with 500 grams of distilled water containing several different quantities of $H_2O_2$, held at a low boil for 5 minutes and filtered through cheesecloth and Mira-cloth. The extract was adjusted to pH 5, cooled to 15° C., polished and freeze-dried. The results of a series of extractions using varying amounts of $H_2O_2$ are given in Table 2 below. The results demonstrate that soluble constituents are obtained in high yields by $H_2O_2$ extraction of whole black tea leaf.

TABLE 2.—EFFECT OF HYDROGEN PEROXIDE ON THE EXTRACTION OF WHOLE BLACK TEA LEAF

| Percent $H_2O_2$ (based on tea leaf) | pH of extract (before adjustment to pH 5.0) | Percent yield— | | |
|---|---|---|---|---|
| | | Of black tea leaf | After polishing | Klett color[a] |
| 0 (control) | 5.0 | 29.0 | 24.6 | 185 |
| 3.5 | 4.5 | 33.7 | 33.2 | 145 |
| 7.0 | 4.3 | 37.9 | 35.6 | 120 |
| 10.0 | 4.2 | 40.9 | 38.3 | 110 |

[a] Observation made at beverage strength: (1) visual color of all samples—very light, yellow; (2) taste—neutral, no off-tastes; (3) clarity of all samples—slightly turbid.

EXAMPLE 5

100 grams of whole black tea leaf was combined with 1000 grams of distilled water containing 7 grams of $H_2O_2$, held at a low boil for five minutes and filtered through cheesecloth and Mira-cloth to provide Extract I, which represented a 34.8% yield. When this extract was decreamed at 10° C., a yield of 7.7% tea solids as cream was obtained. By way of comparison, a yield of about 25% tea solids as cream is obtained by decreaming a tea extract obtained using conventional hot water extraction techniques. This indicates a substandard increase in the cold water solubility of the tea solids obtained according to this invention.

The spent tea leaves were combined with 1000 grams of water and the pH was adjusted to 5.0 with KOH. The slurry was boiled for five minutes and filtered. The spent leaf was discarded. The extract obtained, Extract II, represented an additional 8.4% yield of solids, based on the weight of the original leaf.

Extract I was decreamed at 10° C., losing 7.7% tea solids as cream. This cream fraction was combined with Extract II. The combined Extract II and cream solids was adjusted to pH 10.5 with KOH and oxidized by sparging with air for 30 minutes at 70° C. The pH was then adjusted to pH 5 with HCl and the oxidized material was combined with the decreamed Extract I.

The combined materials were then polished at 15° C., losing 2.5% of tea solids, concentrated, and dried to provide a yield of cold water soluble tea solids, based on black tea leaf, of 42.1%.

We claim:
1. A process for extracting tea leaves, comprising the steps of bringing an aqueous solution of peroxide into contact with tea leaves to obtain a slightly acid condition of a pH of approximately 4.2 and for a time and at a temperature sufficient to solubilize and extract tea solids from the leaves, and filtering the leaf residue from the extract, the peroxide concentration during contact with the leaf being approximately 3% to 10% based upon the dry weight of the tea leaves the extracted tea solids being soluble in cold, hard water without further processing.
2. A process as set forth in claim 1, wherein the tea leaves are spent tea leaves.
3. A process as set forth in claim 2, wherein the extract containing the dissolved tea solids is combined with a hot water tea leaf extract and dried, forming an instant tea powder.
4. A process as set forth in claim 1, wherein the extract is dried to yield dried tea solids.
5. A process as set forth in claim 4, wherein the extract is spray-dried to yield dried tea solids.
6. The product of the process of claim 4.
7. A process as set forth in claim 1, wherein the mixture of tea leaves and peroxide is heated to 100° C. during extraction.

8. A process as set forth in claim 1, wherein the extraction period is approximately 5 minutes to 2 hours.

9. A process as set forth in claim 1 wherein the peroxide is hydrogen peroxide.

10. A process as set forth in claim 1, wherein the pH of the extract is adjusted to approximately pH 4.9 to 5.0.

11. A process as set forth in claim 10, wherein the pH of the extract is adjusted by adding the requisite amount of KOH.

References Cited

UNITED STATES PATENTS

| | | | |
|---|---|---|---|
| 3,481,744 | 12/1969 | Giddey et al. | 99—77 |
| 3,369,906 | 2/1968 | Kwo-wei Chen | 99—76 X |
| 3,151,985 | 10/1964 | Fobes | 99—76 X |
| 3,484,248 | 12/1969 | Graham et al. | 99—76 |

FRANK W. LUTTER, Primary Examiner

S. L. WEINSTEIN, Assistant Examiner